April 9, 1929.  A. C. HOPKINS  1,707,981

WIRE TYING TOOL

Filed Dec. 23, 1927

INVENTOR
Arthur C. Hopkins
BY Chappell Earl
ATTORNEYS

Patented Apr. 9, 1929.

1,707,981

UNITED STATES PATENT OFFICE.

ARTHUR C. HOPKINS, OF NILES, MICHIGAN, ASSIGNOR TO NATIONAL-STANDARD COMPANY, OF NILES, MICHIGAN.

WIRE-TYING TOOL.

Application filed December 23, 1927. Serial No. 242,092.

The main object of this invention is to provide an improved wire tying tool of the type employing a pair of spaced relatively fixed slotted jaws and a rotary jaw in which the jaws can be readily changed for adaptation of the tool to different gages of wire or for replacement, also permitting the use of special material for the jaws.

Objects pertaining to details and economies of my invention will definitely appear from the description to follow. The invention is defined in the claims.

A structure embodying the features of my invention is clearly illustrated in the accompanying drawing, in which.

Figure 1:
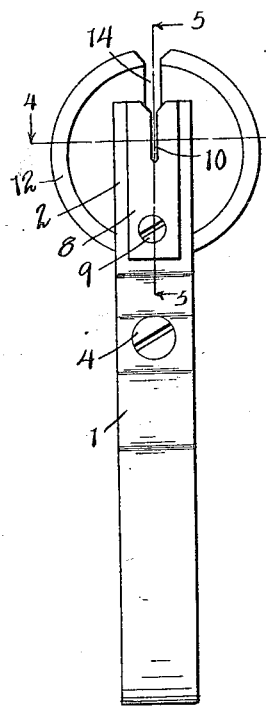
Fig. 1 is a side elevation of my improved wire twisting tool.
Figure 2:
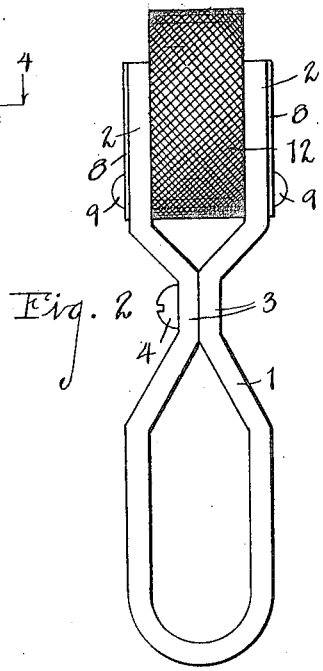
Fig. 2 is a plan view thereof.
Figure 3:
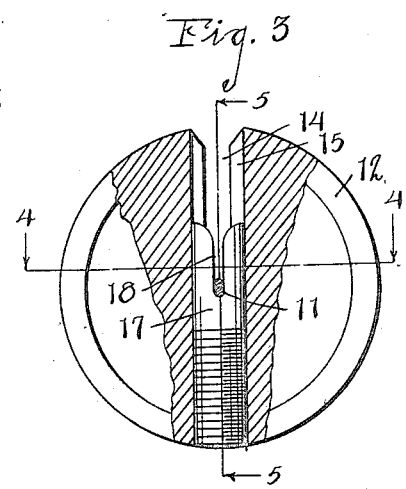
Fig. 3 is an enlarged detail view of the twisting wheel partially in section on line 3—3 of Fig. 6.
Figure 5:
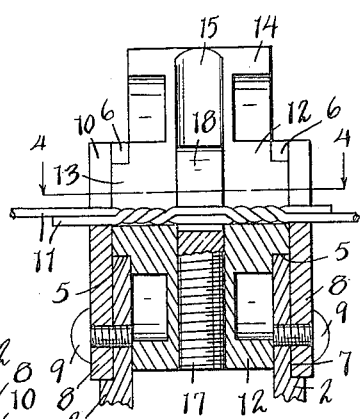
Fig. 5 is a detail view mainly in longitudinal section on line 5—5 of Figs. 1 and 3.
Figure 4:
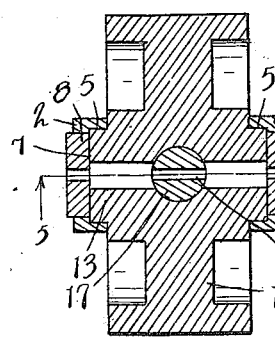
Fig. 4 is a transverse section on a line corresponding to line 4—4 of Figs. 1, 3, 5 and 6.

As illustrated in the drawing, my improved tying tool comprises a handle 1 having a pair of spaced arms 2 formed integrally therewith, this handle and the arms being formed of a bar folded upon itself with the loop portion constituting the handle and the ends constituting the arms. Inward offsets 3 are formed between the arms and handle and clamped together by a screw 4.

Figure 6:
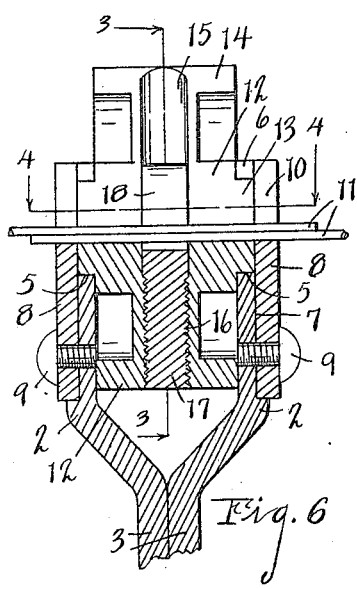
Fig. 6 is a detail section corresponding to that of Fig. 5 illustrating the relation of the wires to be tied prior to the tying operation, the tied wires being shown in Fig. 5.

The arms are provided with bearings 5 having radial slots 6 at the ends of the arms. The arms also have recess-like jaw seats 7 in their outer sides which are preferably of rectangular cross section to receive the plate-like jaws 8. By thus forming the seat the single screws 9 are effective in clamping the jaws in place. These jaws have longitudinal slots 10 alined with the slots 6 of the bearing, the slots being of a width to receive the ends of the wires to be tied as 11, see Fig. 6, with the wires in superimposed relation.

The twisting wheel 12 is provided with bearings 13 coacting with the bearings 5. When the screw 4 is disengaged the arms may be sprung apart sufficiently to receive these journals to permit the insertion or removal of the twisting wheel. The twisting wheel has a radial slot 14 extending from one side to a point slightly beyond its axial center so that the wires, when arranged in the jaws 10, lie in approximately the axial center of the twisting wheel.

The twisting wheel also has a radial bore 15 alined with and centered relative to the slot, this bore being threaded at 16 to receive the jaw 17. This jaw is cylindrical and has a longitudinal slot 18 of a width corresponding to the width of the slots 10 of the fixed jaws.

In practice the jaw 17 is introduced from the slotted end of the bore, a screw-driver being engaged by the slot in the jaw to thread it into the threaded portion of the bore and properly position the jaw.

With this arrangement of parts the jaws may be quickly changed to adapt the tool to wire of different gages or for renewal of the jaws should occasion require, although by forming the jaws separately as shown, they may be formed of wear resisting material or hardened as may be desired.

Having thus described my invention what I claim as new and desire to secure by Letters Patent is:

1. In a wire tying tool, the combination of a handle provided with a pair of spaced arms having longitudinal recess-like jaw seats in their outer sides and opposed bearings having radial slots at the ends of the arms, longitudinally slotted plate-like jaws removably secured in said jaw seats in said arms, a twisting wheel journaled in said bearings and having a radial slot adapted to be brought into alinement with said slots in said jaws, said twisting wheel also having a radial bore therethrough alined with and centered relative to said radial slot, said bore being threaded at one end, and a removable jaw member having a longitudinal slot alined with said slot in said twisting wheel and having threaded engagement with the threads of said bore whereby it is removably supported.

2. In a wire tying tool, the combination of a handle provided with a pair of spaced arms having longitudinal recess-like jaw seats in their outer sides and opposed bearings having radial slots at the ends of the arms, longitudinally slotted plate-like jaws removably secured in said jaw seats in said arms, a twisting wheel journaled in said bearings and having a radial slot adapted to be brought into alinement with said slots in said jaws, said twisting wheel also having a radial bore therethrough alined with and centered relative to said radial slot, and a jaw member having a longitudinal slot alined with said slot in said twisting wheel removably secured in said bore.

3. In a wire tying tool, the combination of a handle provided with a pair of spaced arms having opposed bearings having radial slots therein, slotted jaws removably secured to said arms with their slots in alinement with said slots in said bearings, a twisting wheel journaled in said bearings and having a radial slot adapted to be brought into alinement with said slots in said jaws, said twisting wheel also having a radial bore therethrough alined with its said radial slot, said bore being threaded at one end, and a removable jaw member having a longitudinal slot alined with said slot in said twisting wheel and having threaded engagement with the threads of said bore whereby it is removably supported.

4. In a wire tying tool, the combination of a handle provided with a pair of spaced arms having opposed bearings having radial slots therein, slotted jaws removably secured to said arms with their slots in alinement with said slots in said bearings, a twisting wheel journaled in said bearings and having a radial slot adapted to be brought into alinement with said slots in said jaws, said twisting wheel also having a radial bore therethrough alined with its said radial slot, and a jaw member having a longitudinal slot alined with said slot in said twisting wheel removably secured in said bore.

In witness whereof I have hereunto set my hand.

ARTHUR C. HOPKINS.